(12) United States Patent
Kumar et al.

(10) Patent No.: US 12,154,083 B2
(45) Date of Patent: Nov. 26, 2024

(54) BANK-BASED ONBOARDING FOR MERCHANT INTEGRATION

(71) Applicant: Capital One Services, LLC, McLean, VA (US)

(72) Inventors: Kaush Kumar, Vienna, VA (US); Jeffrey Rule, Chevy Chase, MD (US); Jinlian Wang, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 102 days.

(21) Appl. No.: 17/568,014

(22) Filed: Jan. 4, 2022

(65) Prior Publication Data

US 2023/0214805 A1 Jul. 6, 2023

(51) Int. Cl.
*G06Q 20/10* (2012.01)
*G06Q 20/22* (2012.01)
*G06Q 20/40* (2012.01)

(52) U.S. Cl.
CPC ......... *G06Q 20/108* (2013.01); *G06Q 20/227* (2013.01); *G06Q 20/409* (2013.01)

(58) Field of Classification Search
CPC ... G06Q 20/108; G06Q 20/227; G06Q 20/409
USPC ........................................................ 705/406
See application file for complete search history.

(56) References Cited

U.S. PATENT DOCUMENTS

| | | | |
|---|---|---|---|
| 8,887,229 B1 | 11/2014 | Ellmore | |
| 9,741,036 B1 | 8/2017 | Grassadonia et al. | |
| 9,922,371 B1 | 3/2018 | Bailey | |
| 10,467,615 B1 | 11/2019 | Omojola et al. | |
| 10,489,781 B1 | 11/2019 | Osborn et al. | |
| 10,909,582 B1* | 2/2021 | Brandt | H04L 63/102 |
| 2014/0089191 A1 | 3/2014 | Brown | |
| 2017/0024719 A1 | 1/2017 | Finch et al. | |
| 2018/0315051 A1 | 11/2018 | Hurley et al. | |
| 2020/0380510 A1 | 12/2020 | Hare et al. | |

(Continued)

OTHER PUBLICATIONS

"Two Factor Authentication and transaction validation using a mobile phone" Published by University of Nairobi Research Archive (Year: 2013).*

(Continued)

*Primary Examiner* — Zeina Elchanti
(74) *Attorney, Agent, or Firm* — Sterne, Kessler, Goldstein & Fox P.L.L.C.

(57) ABSTRACT

Embodiments disclosed are directed to a computing system that performs steps for entity integration. The computing system receives, from a user device, an electronic request to associate a first online account of a user associated with a first entity with a second online account of the user associated with a second entity. The computing system authenticates the user device to verify that an identity of the user is authentic. The computing system determines whether the second online account exists and, if so, identifies a match between a first user property of the first online account and a second user property of the second online account. Based on the identified match, the computing system links the first online account with the second online account and updates, based on a first online account property of the first online account, a second online account property of the second online account.

20 Claims, 6 Drawing Sheets

(56) References Cited

U.S. PATENT DOCUMENTS

2021/0400032 A1* 12/2021 Ryu ..................... G06F 3/0488

OTHER PUBLICATIONS

Eden Estopace, "Visa Checkout to bring online payment convenience to 16 markets in 2015", Feb. 22, 2015, p. 1, SMB World Asia, Proquest document ID 1657240438.
International Search Report and Written Opinion directed to related application No. PCT/US2023/60022, mailed Apr. 13, 2023, 3 pages.

* cited by examiner

BANK-BASED ONBOARDING FOR MERCHANT INTEGRATION

TECHNICAL FIELD

Embodiments relate to entity integration, specifically a system that performs bank-based onboarding for merchant integration.

BACKGROUND

When customers make purchases at merchant sites, they typically need to create an account with the merchant to shop at the merchant site or to remember their purchasing histories. Further, when fraud occurs, the customers must manually update their credit card information in each of their merchant accounts. As a result, much effort is required from customers to create and maintain their merchant accounts.

SUMMARY

Provided herein are system, apparatus, article of manufacture, method and/or computer program product embodiments, and/or combinations and sub-combinations thereof, for entity integration.

Several embodiments are directed to computer-implemented methods for entity integration. For example, a computer-implemented method can include receiving, by a cloud server and from a user device in response to input from a user of the user device, an electronic request to associate a first online account of the user with a second online account of the user. The first online account can be associated with a first entity, and the second online account can be associated with a second entity different from the first entity. The computer-implemented method can further include authenticating, by an authentication service of the cloud server, the user device to verify that an identity of the user is authentic. The computer-implemented method can further include determining, by an analysis service of the cloud server, whether the second online account exists. In response to determining that the second online account exists, the computer-implemented method can further include identifying, by a comparison service of the cloud server, a match between a first user property of the first online account and a second user property of the second online account. Subsequently, based on the identified match, the computer-implemented method can further include linking, by a linking service of the cloud server, the first online account with the second online account, and updating, by a control service of the cloud server and based on a first online account property of the first online account, a second online account property of the second online account.

In several embodiments, the first entity can be a financial institution. In several embodiments, the second entity can be a merchant. In several embodiments, the first user property can be a first e-mail address. In several embodiments, the second user property can be a second e-mail address. In several embodiments, the first online account property can include first credit card information. In several embodiments, the second online account property can include second credit card information.

In several embodiments, the linking the first online account with the second online account can include linking, by the linking service of the cloud server, the first online account with the second online account in response to the user logging into the first online account through a graphical user interface associated with the second online account.

In several embodiments, the first online account can include a plurality of payment methods having a plurality of rewards points options. After linking the first online account with the second online account, the computer-implemented method can further include: receiving, by the cloud server and from the second entity, an electronic transaction request associated with the second online account; selecting, by the a payment method selection service of the cloud server, one of the plurality of payment methods having a maximum rewards points for the electronic transaction request; generating, by an electronic message generation service of the cloud server, a first electronic message recommending the selected one of the plurality of payment methods for completing the electronic transaction request; transmitting, by the cloud server, the first electronic message to a secure application installed on the user device and associated with the user, the first online account, and the first entity; receiving, by the cloud server and from the secure application, a second electronic message indicative of an instruction from the user to complete the electronic transaction request using the selected one of the plurality of payment methods; and, in response to receiving the second electronic message, completing, by a payment processing service of the cloud server, the electronic transaction request using the selected one of the plurality of payment methods.

In several embodiments, in response to determining that the second online account does not exist, the computer-implemented method can further include generating, by an online account generation service of the cloud server, the second online account based on the first online account. In several embodiments, the computer-implemented method can further include generating, by a password generation service of the cloud server, a password for the second online account; generating, by an electronic message generation service of the cloud server, an electronic message including the password; and transmitting, by the cloud server, the electronic message to a secure application installed on the user device and associated with the user, the first online account, and the first entity.

In several embodiments, in response to detecting an unauthorized access to the first online account, the computer-implemented method can further include locking, by the control service of the cloud server, the first online account property of the first online account; and updating, by the control service of the cloud server and based on the locked first online account property of the first online account, the second online account property of the second online account to lock the second online account property of the second online account.

Several embodiments are directed to non-transitory computer readable media. For example, a non-transitory computer readable medium can include instructions for causing a processor to perform operations for entity integration. The operations can include receiving, from a user device in response to input from a user of the user device, an electronic request to associate a first online account of the user with a second online account of the user. The first online account can be associated with a first entity, and the second online account can be associated with a second entity different from the first entity. The operations can further include authenticating the user device to verify that an identity of the user is authentic. The operations can further include determining whether the second online account exists. In response to determining that the second online account exists, the operations can further include identifying a match between a first user property of the first online account and a second user property of the second online account. Subsequently, based on the identified match, the operations can further include linking the first online account with the second online account and updating, based on a first online account property of the first online account, a second online account property of the second online account.

In several embodiments, to perform the linking the first online account with the second online account, the operations include linking the first online account with the second online account in response to the user logging into the first online account through a graphical user interface associated with the second online account.

In several embodiments, the first online account includes a plurality of payment methods having a plurality of rewards points options. After linking the first online account with the second online account, the operations further can further include: receiving, from the second entity, an electronic transaction request associated with the second online account; selecting one of the plurality of payment methods having a maximum rewards points for the electronic transaction request; generating a first electronic message recommending the selected one of the plurality of payment methods for completing the electronic transaction request; transmitting the first electronic message to a secure application installed on the user device and associated with the user, the first online account, and the first entity; receiving, from the secure application, a second electronic message indicative of an instruction from the user to complete the electronic transaction request using the selected one of the plurality of payment methods; and, in response to receiving the second electronic message, completing the electronic transaction request using the selected one of the plurality of payment methods.

In several embodiments, in response to determining that the second online account does not exist, the operations can further include generating the second online account based on the first online account. In several embodiments, the operations can further include: generating a password for the second online account; generating an electronic message including the password; and transmitting the electronic message to a secure application installed on the user device and associated with the user, the first online account, and the first entity.

In several embodiments, in response to detecting an unauthorized access to the first online account, the operations can further include: locking the first online account property of the first online account; and updating, based on the locked first online account property of the first online account, the second online account property of the second online account to lock the second online account property of the second online account.

Several embodiments are directed to computing systems for entity integration. For example, a computing system can include a storage unit configured to store instructions. The computer system can further include a control unit coupled to the storage unit and configured to process the stored instructions to perform operations that include receiving, from a user device in response to input from a user of the user device, an electronic request to associate a first online account of the user with a second online account of the user. The first online account can be associated with a first entity, and the second online account can be associated with a second entity different from the first entity. The operations can further include authenticating the user device to verify that an identity of the user is authentic. The operations can further include determining whether the second online account exists. In response to a determination that the second online account exists, the operations can further include identifying a match between a first user property of the first online account and a second user property of the second online account. Based on the identified match, the operations can further include linking the first online account with the second online account and updating, based on a first online account property of the first online account, a second online account property of the second online account.

In several embodiments, to link the first online account with the second online account, the control unit can be configured to process the stored instructions to perform operations including linking the first online account with the second online account in response to the user logging into the first online account through a graphical user interface associated with the second online account.

In several embodiments, the first online account can include a plurality of payment methods having a plurality of rewards points options. After the first online account has been linked with the second online account, the control unit can be further configured to process the stored instructions to perform operations including receiving, from the second entity, an electronic transaction request associated with the second online account. The operations can further include selecting one of the plurality of payment methods having a maximum rewards points for the electronic transaction request. The operations can further include generating a first electronic message recommending the selected one of the plurality of payment methods for completing the electronic transaction request. The operations can further include transmitting the first electronic message to a secure application installed on the user device and associated with the user, the first online account, and the first entity. The operations can further include receiving, from the secure application, a second electronic message indicative of an instruction from the user to complete the electronic transaction request using the selected one of the plurality of payment methods. In response to a receipt of the second electronic message, the operations can further include completing the electronic transaction request using the selected one of the plurality of payment methods.

In several embodiments, in response to a third determination that the second online account does not exist, the control unit can be further configured to process the stored instructions to perform operations including generating the second online account based on the first online account, generating a password for the second online account, generating an electronic message including the password, and transmitting the electronic message to a secure application installed on the user device and associated with the user, the first online account, and the first entity.

In several embodiments, in response to a detection of an unauthorized access to the first online account, the control unit can be further configured to process the stored instructions to perform operations including locking the first online account property of the first online account and updating, based on the locked first online account property of the first online account, the second online account property of the second online account to lock the second online account property of the second online account.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

FIGS. 1A and 1B illustrate an example system for entity integration according to some embodiments.

DETAILED DESCRIPTION

Figure 1A:
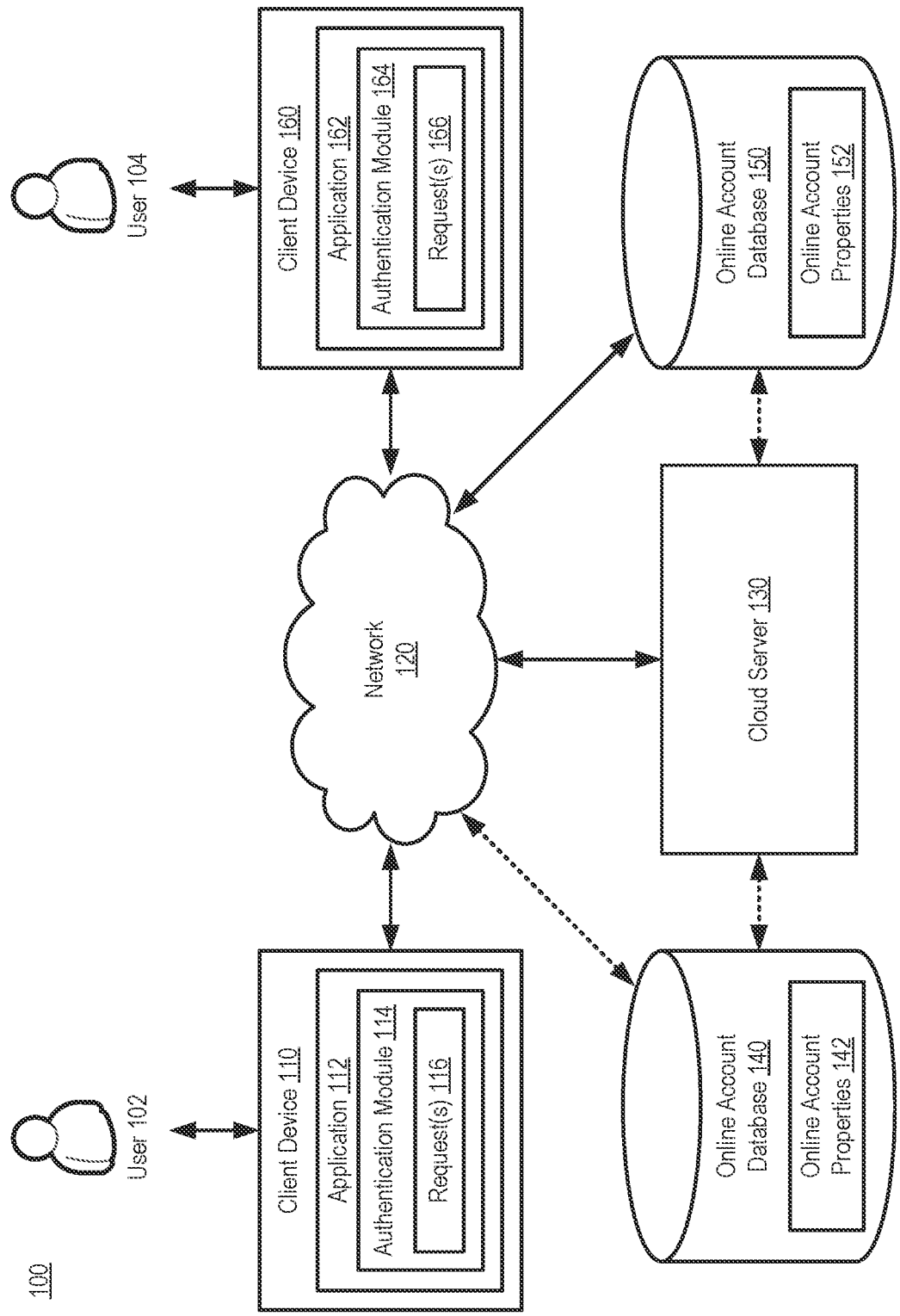

Embodiments disclosed herein relate to systems and methods for entity integration. The systems and methods disclosed herein may achieve entity integration by utilizing a user's financial institution account when making a transaction with a merchant to integrate or create the user's merchant account.

In several embodiments, a financial institution can utilize bank-based onboarding to integrate user accounts with merchants. After utilizing various methods of authentication to verify that the user's identity is true (e.g., gov-id, step-up, sms-opt, etc.), the financial institution can link to the merchants desired by a user and, if the user's email on file with the financial institution matches with the user's email on file with the merchants, the financial institution can link the accounts together to update the credit card on file with those merchants. If an account with a merchant does not exist, the financial institution can create one for the user using the user's email address on file with the financial institution and generate a password for the user that is available for them in their secure banking app provided by the financial institution. This option could be used both (i) to create a new account with the merchant if one does not exist and (ii) to link existing accounts together with the financial institution, all in one click.

In several embodiments, a merchant could also allow a "Login with <Financial Institution>" option similar to "Login with Google" and other such techniques. This can enable users to link their financial institution and merchant accounts to use (e.g., in some aspects, to always use) the updated card information or to use a virtual card with each of these merchants. When fraud happens, the financial institution can update the user's account with the merchant with a new card on file to avoid disruptions to the user's purchasing activity.

In several embodiments, after the account is linked or created, when the user wants to checkout, the financial institution can pull up the user's credit cards with the financial institution and suggest the credit cards that will earn the maximum rewards points for the user, all without the user having to enter their credit card number, billing address, and other details. The merchant also benefits because checkout is faster and the financial institution updates the user's credit card on file in case the credit card number changes, resulting in less friction.

In several embodiments, if the user's account with the merchant was created by the financial institution and the password is known to the financial institution, the financial institution can further: (i) update and/or lock the user's credit card at the merchant site if a breach or fraud happens; (ii) step up the user if a purchase happens right around when the breach or fraud has happened; and (iii) ask the user to update the credit card on file at the merchant site based on knowledge of how old the card number is.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in embodiments of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

System Overview and Function

Figure 1B:
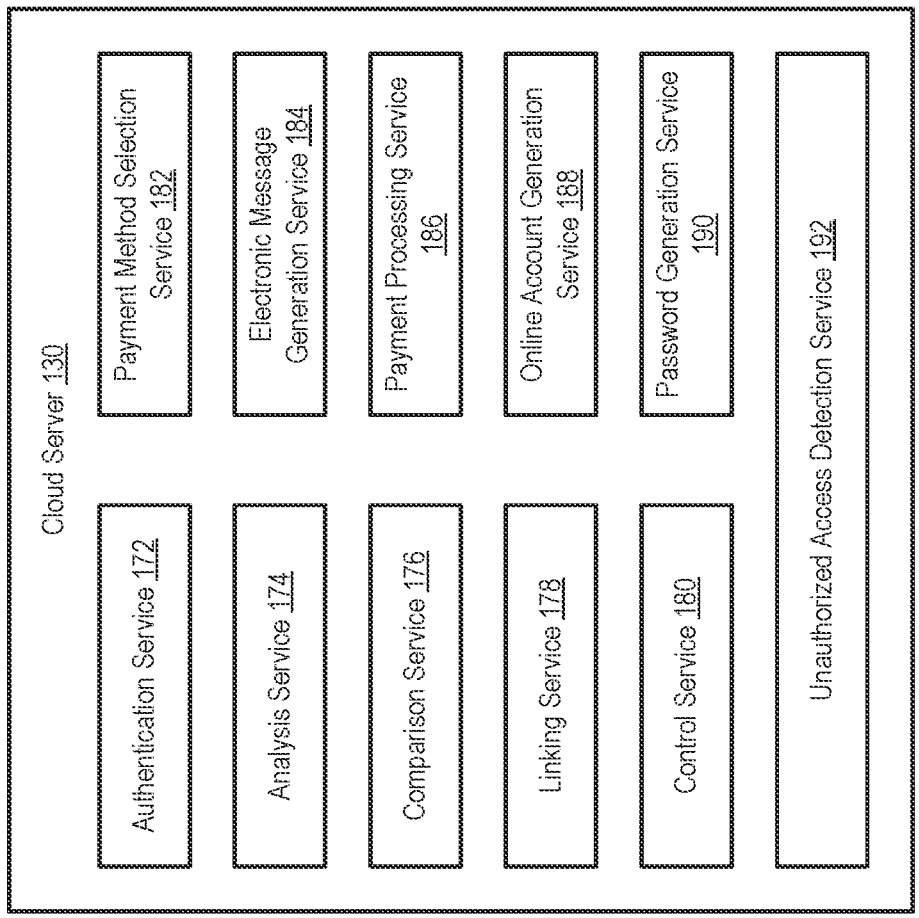

FIGS. 1A and 1B illustrate an example system 100 for entity integration according to some embodiments. In several embodiments, as shown in FIG. 1A, system 100 can include a client device 110 associated with a user 102, a client device 160 associated with a user 104, a network 120, a cloud server 130, a first online account database 140 associated with a first entity (e.g., a financial institution), and a second online account database 150 associated with a second entity (e.g., a merchant). In several embodiments, the client device 110 can further include an application 112 which, in several embodiments, includes an authentication module 114 having access to a plurality of device attributes stored on, or in association with, the client device 110. In several embodiments, the client device 160 can further include an application 162 which, in several embodiments, includes an authentication module 164 having access to a plurality of device attributes stored on, or in association with, the client device 160. In several embodiments, as shown in FIG. 1B, the cloud server 130 can include an authentication service 172, an analysis service 174, a comparison service 176, a linking service 178, a control service 180, a payment method selection service 182, an electronic message generation service 184, a payment processing service 186, an online account generation service 188, a password generation service 190, an unauthorized access detection service 192, any other suitable service, or any combination thereof.

The client device 110 and the client device 160 may be any of a variety of centralized or decentralized computing devices. For example, one or both of the client device 110 and the client device 160 may be a mobile device, a laptop computer, a desktop computer, or a point-of-sale (POS) device. In several embodiments, one or both of the client device 110 and the client device 160 can function as a stand-alone device separate from other devices of the system 100. The term "stand-alone" can refer to a device being able to work and operate independently of other devices. In several embodiments, the client device 110 and the client device 160 can store and execute the application 112 and the application 162, respectively.

Each of the application 112 and the application 162 may refer to a discrete software that provides some specific functionality. For example, the application 112 may be a mobile application that the user 102 can utilize to perform some functionality, whereas the application 162 may be a mobile application that the user 104 can utilize to perform some functionality. For example and without limitation, the user 102, the user 104, or both can utilize the functionality to perform banking, data transfers, or commercial transactions. In other embodiments, one or more of the application 112 and the application 162 may be a desktop application that the user 102 or the user 104 can utilize to perform the aforementioned functionalities.

In several embodiments, the client device 110 and the client device 160 can be coupled to the cloud server 130 via a network 120. The cloud server 130 may be part of a backend computing infrastructure, including a server infrastructure of a company or institution, to which the application 112 and the application 162 belong. While the cloud server 130 is described and shown as a single component in FIGS. 1A and 1B, this is merely an example. In some embodiments, the cloud server 130 can comprise a variety of centralized or decentralized computing devices. For example, the cloud server 130 may include a mobile device, a laptop computer, a desktop computer, grid-computing resources, a virtualized computing resource, cloud computing resources, peer-to-peer distributed computing devices, a server farm, or a combination thereof. The cloud server 130 may be centralized in a single room, distributed across different rooms, distributed across different geographical locations, or embedded within the network 120. While the devices comprising the cloud server 130 can couple with the network 120 to communicate with the client device 110 and the client device 160, the devices of the cloud server 130 can also function as stand-alone devices separate from other devices of the system 100.

In several embodiments, the cloud server 130 can be implemented using cloud computing resources of a public or private cloud. A private cloud refers to a cloud environment similar to a public cloud with the exception that it is operated solely for a single organization.

In several embodiments, the cloud server 130 can couple to the client device 110 to allow the application 112 to function. For example, in several embodiments, both the client device 110 and the cloud server 130 can have at least a portion of the application 112 installed thereon as instructions on a non-transitory computer readable medium. The client device 110 and the cloud server 130 can both execute portions of the application 112 using client-server architectures, to allow the application 112 to function.

In several embodiments, the cloud server 130 can couple to the client device 160 to allow the application 162 to function. For example, in several embodiments, both the client device 160 and the cloud server 130 can have at least a portion of the application 162 installed thereon as instructions on a non-transitory computer readable medium. The client device 160 and the cloud server 130 can both execute portions of the application 162 using client-server architectures, to allow the application 162 to function.

In several embodiments, the cloud server 130 can transmit requests and other data to, and receive requests, indications, device attributes, and other data from, the authentication module 114 and the authentication module 164 (and in effect the client device 110 and the client device 160, respectively) via the network 120. The network 120 refers to a telecommunications network, such as a wired or wireless network. The network 120 can span and represent a variety of networks and network topologies. For example, the network 120 can include wireless communications, wired communications, optical communications, ultrasonic communications, or a combination thereof. For example, satellite communications, cellular communications, Bluetooth, Infrared Data Association standard (IrDA), wireless fidelity (Wi-Fi), and worldwide interoperability for microwave access (WiMAX) are examples of wireless communications that may be included in the network 120. Cable, Ethernet, digital subscriber line (DSL), fiber optic lines, fiber to the home (FTTH), and plain old telephone service (POTS) are examples of wired communications that may be included in the network 120. Further, the network 120 can traverse a number of topologies and distances. For example, the network 120 can include a direct connection, personal area network (PAN), local area network (LAN), metropolitan area network (MAN), wide area network (WAN), or a combination thereof. For illustrative purposes, in the embodiment of FIGS. 1A and 1B, the system 100 is shown with the client device 110, the client device 160, and the cloud server 130 as end points of the network 120. This, however, is an example and it is to be understood that the system 100 can have a different partition between the client device 110, the client device 160, the cloud server 130, and the network 120. For example, the client device 110, the client device 160, and the cloud server 130 can also function as part of the network 120.

In several embodiments, the client device 110 and the client device 160 can include at least the authentication module 114 and the authentication module 164, respectively. In several embodiments, each of the authentication module 114 and the authentication module 164 may be a module of the application 112 and the application 162, respectively. In several embodiments, the authentication module 114 and the authentication module 164 can enable the client device 110 and the client device 160, respectively, and/or the application 112 and the application 162, respectively, to receive requests and other data from, and transmit requests, device attributes, indications, and other data to, the authentication service 172 and/or the cloud server 130 via the network 120. In several embodiments, this may be done by having the authentication module 114 and the authentication module 164 couple to the authentication service 172 via an API to transmit and receive data as a variable or parameter.

In several embodiments, the cloud server 130 can include at least the authentication service 172. In several embodiments, the authentication service 172 may be implemented as a software application on the cloud server 130. In several embodiments, the authentication service 172 can enable receipt of electronic information (e.g., device attributes, online account properties) from the authentication module 114 and the authentication module 164. This may be done, for example, by having the authentication service 172 couple to the authentication module 114 and the authentication module 164 via a respective API to receive the electronic information as a variable or parameter. In several embodiments, the authentication service 172 can further enable storage of the electronic information in a local storage device or transmission (e.g., directly, or indirectly via the network 120) of the electronic information to the first online account database 140, the second online account database 150, or both for storage and retrieval.

The first online account database 140 may be a database or repository used to store first online account properties 142, any other suitable data, or any combination thereof for a first entity, such as a financial institution or bank. For example, the first online account database 140 can store, in a list or as table entries, the online account information for one or more user accounts of the first entity as the first online account properties 142. The second online account database 150 may be a database or repository used to store the second online account properties 152, any other suitable data, or any combination thereof for a second entity, such as a merchant. For example, the second online account database 150 can store, in a list or as table entries, the online account information for one or more user accounts of the second entity as the second online account properties 152.

In a variety of embodiments, the authentication service 172 of the cloud server 130 can provide for authenticating a client device 110 that is attempting to make a transaction (e.g., a balance transfer, adding an authorized user, etc.) with an entity, such as a merchant, and integrating that entity into the financial institution of the user 102 of the client device 110. For example, the cloud server 130 can receive, from the client device 110 in response to input from the user 102, an electronic request to associate a first online account of the user 102 (e.g., stored in the first online account database 140) with a second online account of the user 102 (e.g., potentially stored in the second online account database 150). In several embodiments, the first online account can be associated with a first entity, and the second online account can be associated with a second entity different from the first entity. In several embodiments, the first entity can be a financial institution, and the second entity can be a merchant. The authentication service 172 of the cloud server 130 can authenticate the client device 110 to verify that an identity of the user 102 is authentic. The analysis service 174 of the cloud server 130 can access and analyze the contents of the second online account database 150 to determine whether the second online account exists in the second online account database 150.

In response to determining that the second online account exists in the second online account database 150, the comparison service 176 (e.g., one or more comparators, etc.) of the cloud server 130 can identify a match between a first user property (e.g., included in the first online account properties 142) of the first online account and a second user property (e.g., included in the second online account properties 152) of the second online account. In several embodiments, the first user property can be a first e-mail address of the user 102, and the second user property can be a second e-mail address of the user 102 that matches the first email address of the user 102.

Based on the identified match, the linking service 178 of the cloud server 130 can link the first online account with the second online account. In several embodiments, to link the first online account with the second online account, the linking service 178 of the cloud server 130 can link the first online account with the second online account in response to the user 102 logging into the first online account through a graphical user interface provided by application 112 and associated with the second online account. Subsequently, the control service 180 (e.g., one or more online account controllers) of the cloud server 130 can update, based on a first online account property (e.g., included in the first online account properties 142) of the first online account, a second online account property (e.g., included in the second online account properties 152) of the second online account. In several embodiments, the first online account property can include first credit card information, and the second online account property can include second credit card information that matches the first credit card information. For example, after linking the first and second online accounts, the control service 180 of the cloud server 130 can update the credit card information stored in the second online account properties 152 with the credit card information stored in the first online account properties 142.

In several embodiments, the first online account can include a plurality of payment methods having a plurality of rewards points options. After the linking service 178 of the cloud server 130 has linked the first online account with the second online account, the cloud server 130 can receive, from the second entity (e.g., from the client device 160), an electronic transaction request associated with the second online account. The payment method selection service 182 of the cloud server 130 can select one of the plurality of payment methods having a maximum rewards points for the electronic transaction request. The electronic message generation service 184 of the cloud server 130 can generate a first electronic message recommending the selected one of the plurality of payment methods for completing the electronic transaction request. In several embodiments, the electronic message generation service 184 of the cloud server 130 can encrypt the first electronic message using any suitable encryption technique, such as an Advanced Encryption Standard (AES)-256 symmetric-key encryption technique, an elliptic-curve Diffie-Hellman (ECDH) asymmetric-key encryption technique, or a secure hash algorithm 3 (SHA-3) hashing technique, to generate an encrypted electronic message. The cloud server 130 can transmit the first electronic message to the application 112 (e.g., a secure application) installed on the client device 110 and associated with the user 102, the first online account, and the first entity. The cloud server 130 can receive, from the application 112, a second electronic message indicative of an instruction from the user 102 to complete the electronic transaction request using the selected one of the plurality of payment methods. In response to receiving the second electronic message, the payment processing service 186 of the cloud server 130 can complete the electronic transaction request using the selected one of the plurality of payment methods.

In several embodiments, in response to determining that the second online account does not exist, the online account generation service 188 of the cloud server 130 can generate the second online account based on the first online account stored in the first online account database 140. The password generation service 190 of the cloud server 130 can generate a password for the second online account, such as a random (or pseudo-random) alphanumeric password (e.g., 12 characters) for the second online account. The electronic message generation service 184 of the cloud server 130 can generate an electronic message including the password. In several embodiments, the electronic message generation service 184 of the cloud server 130 can encrypt the electronic message, the password, or both using any suitable encryption technique, such as an AES-256 encryption technique, an ECDH asymmetric-key encryption technique, an ECDH asymmetric-key encryption technique, or a SHA-3 hashing technique, to generate an encrypted electronic message, an encrypted password, or both. The cloud server 130 can transmit the electronic message to the application 112 installed on the client device 110 and associated with the user 102, the first online account, and the first entity. The control service 180 of the cloud server 130 can store the second online account and password in the second online account database 150.

In several embodiments, the unauthorized access detection service 192 of the cloud server 130 can detect, or receive an electronic notification indicative of, an unauthorized access (e.g., including, but not limited to, a data breach) associated with the first online account. In response to detecting, or receiving the electronic notification indicative of, the unauthorized access associated with the first online account, the control service 180 of the cloud server 130 can lock the first online account properties 142 of the first online account. The control service 180 of the cloud server 130 then can update, based on the locked first online account properties 142, the second online account properties 152 of the second online account to lock the second online account properties 152.

In some aspects, system 100 described above significantly improves the state of the art from previous systems because it provides enhanced techniques for performing entity integration. As a result, a customer (e.g., user 102) no longer needs to create an account at a merchant site to shop or remember the customer's purchasing history. The customer's email address at the financial institution can also serve as the customer's login information (e.g., username) at the merchant site. If the customer already has an account with the merchant, the customer's merchant and financial institution accounts can be linked to provide better access to notifications, updated credit card information when fraud happens, etc., with very little effort required from the customer and the customer's user device (e.g., client device 110).

Methods of Operation

Figure 2A:
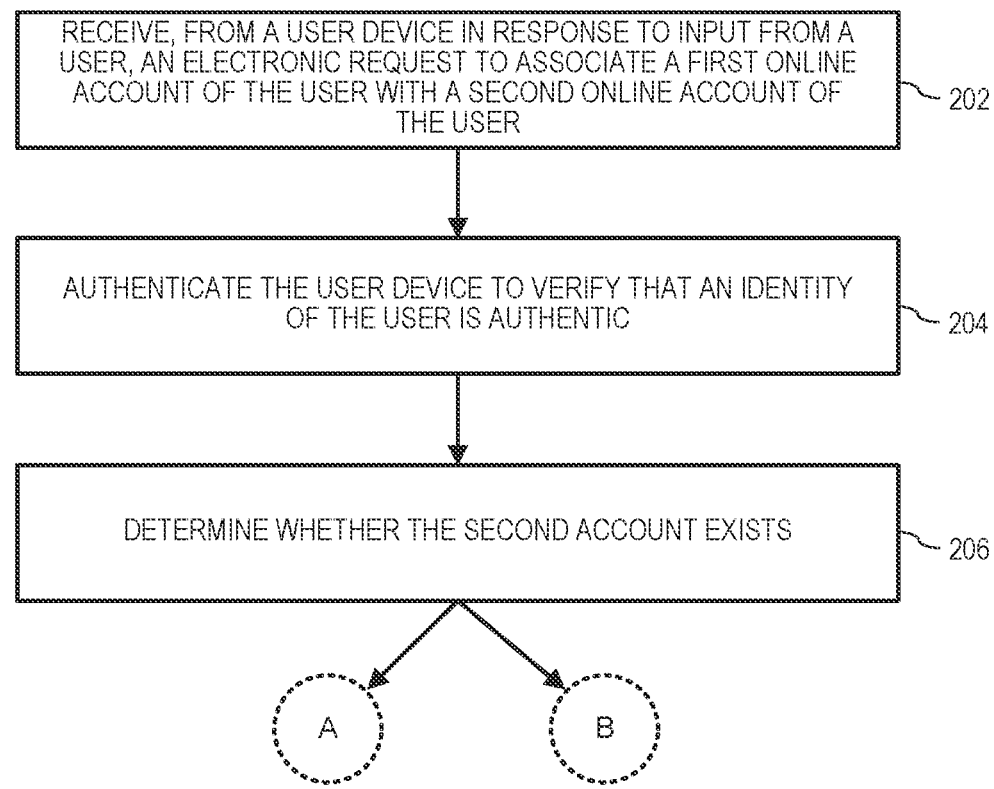
FIGS. 2A, 2B, and 2C illustrate an example method for entity integration according to some embodiments.
Figure 2B:
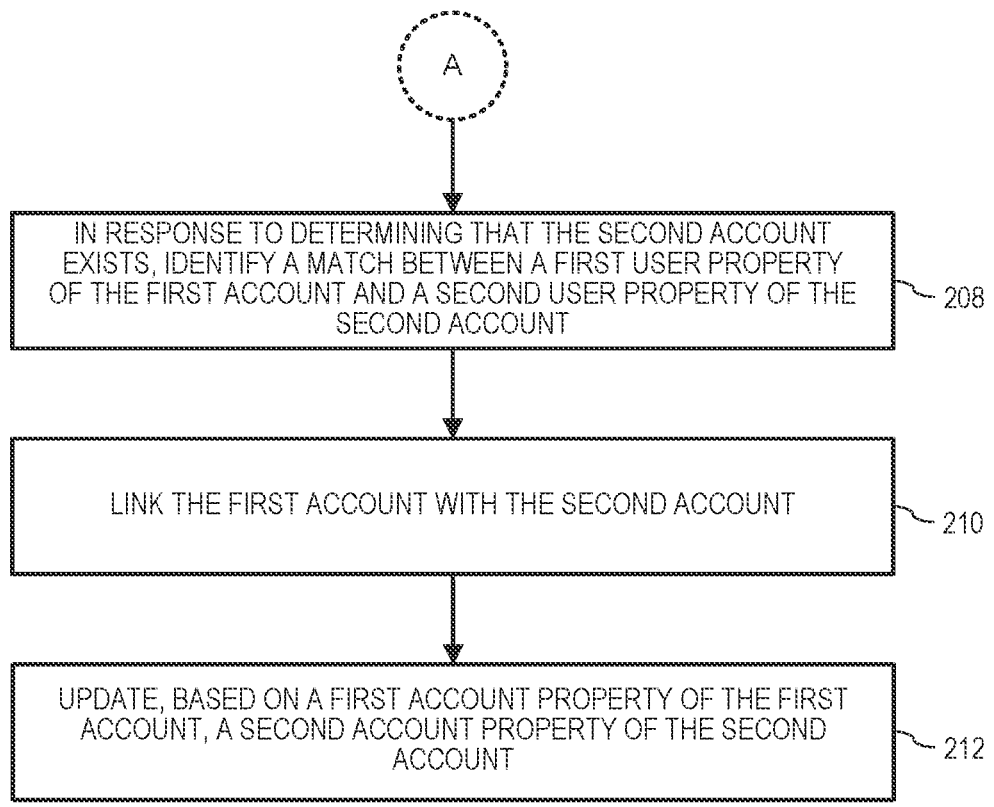
Figure 2C:
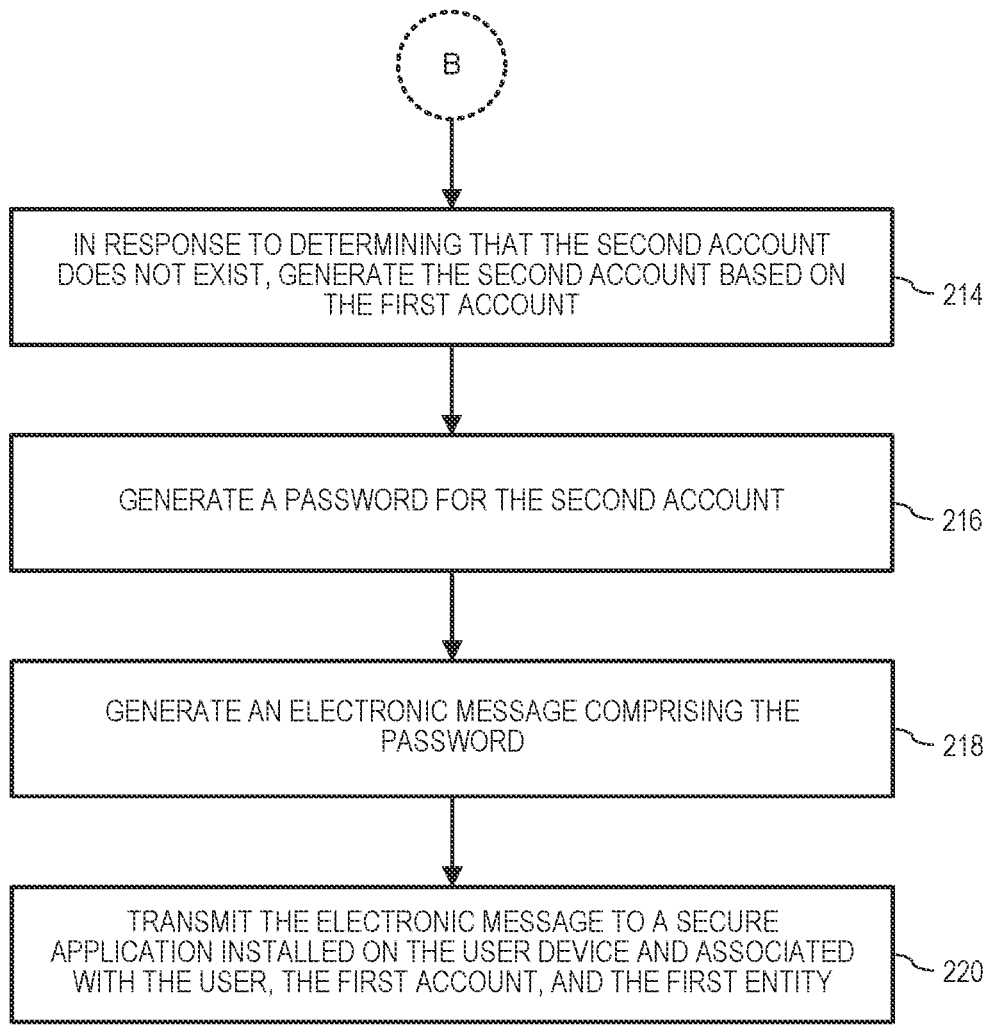

FIGS. 2A, 2B, and 2C illustrate an example method 200 of operating the system 100 to provide for entity integration according to some embodiments. For example, method 200 indicates how the cloud server 130 operates.

As shown in FIG. 2A, in several embodiments, in operation 202 the cloud server 130 can receive, from a user device (e.g., client device 110) in response to input from a user (e.g., user 102) of the user device, an electronic request to associate a first online account of the user with a second online account of the user. The first online account can be associated with a first entity (e.g., a financial institution) that maintains the first online account in a first online account database 140. The second online account can be associated with a second entity different from the first entity that maintains, or will maintain, the second online account in a second online account database 150.

In several embodiments, in operation 204 the cloud server 130 can authenticate (e.g., using the authentication service 172) the user device to verify that an identity of the user is authentic. In several embodiments, the cloud server 130 can authenticate the user device utilizing one or more authentication methods (e.g., gov-id, step-up, sms-opt, etc.) to verify that the user's identity is authentic (e.g., true). For example, in response to receiving the electronic request to associate the first online account of the user with the second online account of the user, the cloud server 130 can verify that the identity of the user is authentic by determining that the user is logged into, or can log into (e.g., by providing account credentials such as username and password) one or both accounts on the user device. In another example, in response to receiving the electronic request to associate the first online account of the user with the second online account of the user, the cloud server 130 can generate and an electronic request for the user to provide an authentic government-issued identification card (e.g., driving license, passport, military ID, social security card, etc.). The user can use the user device to capture one or more images of the user's government-issued identification card and transmit those images to the cloud server 130 for verification, authentication, or both. The cloud server 130 can receive the one or more images of the user's government-issued identification card and verify that the identity of the user is authentic by determining that an image of that document is authentic. The cloud server 130 can determine that the identity of the user is not authentic by determining that an image of that document is or fake, invalid, or otherwise irrelevant.

In several embodiments, in operation 206 the cloud server 130 can determine (e.g., using the analysis service 174) whether the second online account exists. For example, the cloud server 130 can determine that the second online account exists by accessing the second online account database 150 and determining that the second account is included (e.g., stored) in the second online account database 150. In another example, the cloud server 130 can determine that the second online account does not exist by accessing the second online account database 150 and determining that the second account is not included in the second online account database 150.

In several embodiments, in response to determining that the second online account exists, the method 200 can proceed via connector "A" to operation 208 shown in FIG. 2B. In several embodiments, in response to determining that the second online account does not exist, the method 200 can proceed via connector "B" to operation 214 shown in FIG. 2C.

As shown in FIG. 2B, in several embodiments, in response to determining that the second online account exists, in operation 208 the cloud server 130 can identify (e.g., using the comparison service 176) a match between a first user property (e.g., a first e-mail address of the user included in the first online account properties 142) of the first online account and a second user property (e.g., a second e-mail address of the user included in the second online account properties 152) of the second online account.

In several embodiments, based on the identified match, in operation 210 the cloud server 130 can link (e.g., using the linking service 178) the first online account (e.g., included in the first online account database 140) with the second online account (e.g., included in the second online account database 150). For example, the cloud server 130 can link the first online account with the second online account in response to the user logging into the first online account through a graphical user interface (e.g., provided by the application 112 executing on the client device 110) associated with the second online account.

In several embodiments, in operation 212 the cloud server 130 can update (e.g., using the control service 180), based on a first online account property of the first online account, a second online account property of the second online account. In several embodiments, the first online account property can include first credit card information included in the first online account properties 142, and the second online account property can include second credit card information included in the second online account properties 152.

In several embodiments, the first online account can include a plurality of payment methods having a plurality of rewards points options. After linking the first online account with the second online account, in one or more operations the cloud server 130 can: receive, from the second entity (e.g., using the client device 160), an electronic transaction request associated with the second online account; select (e.g., using the payment method selection service 182) one of the plurality of payment methods having a maximum rewards points for the electronic transaction request; generate (e.g., using the electronic message generation service 184) a first electronic message recommending the selected one of the plurality of payment methods for completing the electronic transaction request; transmit the first electronic message to a secure application (e.g., the application 112) installed on the user device and associated with the user, the first online account, and the first entity; receive, from the secure application, a second electronic message indicative of an instruction from the user to complete the electronic transaction request using the selected one of the plurality of payment methods; and, in response to receiving the second electronic message, complete (e.g., using the payment processing service 186) the electronic transaction request using the selected one of the plurality of payment methods.

As shown in FIG. 2C, in several embodiments, in response to determining that the second online account does not exist, in operation 214 the cloud server 130 can generate (e.g., using the online account generation service 188) the second online account based on the first online account. The cloud server 130 can store (e.g., using the control service 180) the second online account in the second online account database 150. The cloud server 130 can further store (e.g., using the control service 180) online account properties associated with the second account as a part of the second online account properties 152.

In several embodiments, in operation 216 the cloud server 130 can generate (e.g., using the password generation service 190) a password for the second online account. For example, the cloud server 130 can utilize the password generation service 190 to generate a random (or pseudo-random) alphanumeric password for the second online account. The cloud server 130 can store (e.g., using the control service 180) the password in association with the second account as a part of the second online account properties 152.

In several embodiments, in operation 218 the cloud server 130 can generate (e.g., using the electronic message generation service 184) an electronic message including the password. For example, the cloud server 130 can generate an electronic mail (e-mail) message that includes the password. In another example, the cloud server 130 can encrypt the password using any suitable encryption technique, such as an AES-256 encryption technique or a SHA-3 hashing technique, to generate an encrypted password. Subsequently, the cloud server 130 can include the encrypted password as a payload in a JSON (JavaScript Object Notation) message.

In several embodiments, in operation 220 the cloud server 130 can transmit the electronic message to a secure application (e.g., the application 112) installed on the user device and associated with the user, the first online account, and the first entity. For example, the cloud server 130 can transmit the electronic message to the secure application installed on the user device over a secure communications channel provided by the network 120.

In some embodiments, operation of method 200 can be performed, for example, by system 100 in accordance with embodiments described above.

In several embodiments, after generating the second online account and password, in one or more operations the cloud server 130 can: detect (e.g., using the unauthorized access detection service 192) an unauthorized access to the first online account; in response to detecting the unauthorized access to the first online account, lock (e.g., using the control service 180) the first online account property of the first online account; and update (e.g., using the control service 180), based on the locked first online account property of the first online account, the second online account property of the second online account to lock the second online account property of the second online account.

Although FIG. 2C shows an example technique for linking two accounts, such as when a merchant has an account and a financial institution has an existing account, the cloud server 130 does not require the merchant to have a pre-existing account. In one illustrative and non-limiting example, a user can verify their financial institution account by entering their email address and receiving a one-time pin (OTP). The financial institution then can send user information (e.g., name, address, phone, credit card number, etc.) to the cloud server 130, which can be used to create an account with the merchant and put a card on file.

Components of the System

Figure 3:
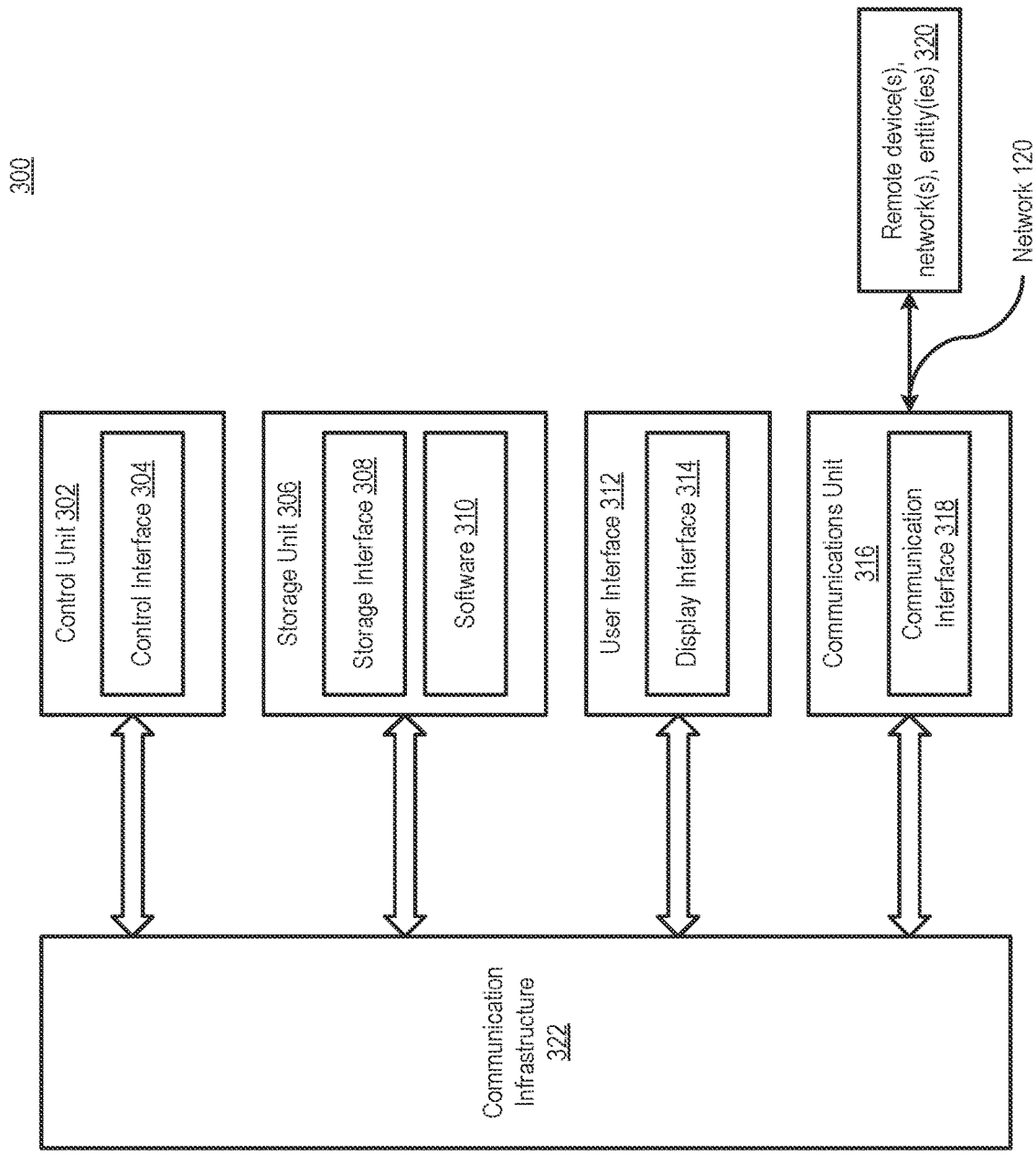
FIG. 3 is an example architecture of components implementing an example system for entity integration according to some embodiments.

FIG. 3 is an example architecture 300 of components implementing the system 100 according to some embodiments. The components may be implemented by any of the devices described with reference to the system 100, such as the client device 110, the client device 160, the cloud server 130, the first online account database 140, the second online account database 150, or a combination thereof. The components may be further implemented by any of the devices described with reference to the method 200.

In several embodiments, the components may include a control unit 302, a storage unit 306, a communication unit 316, and a user interface 312. The control unit 302 may include a control interface 304. The control unit 302 may execute a software 310 (e.g., the application 112, the authentication module 114, the application 162, the authentication module 164, the authentication service 172, or a combination thereof) to provide some or all of the machine intelligence described with reference to system 100. In another example, the control unit 302 may execute a software 310 to provide some or all of the machine intelligence described with reference to method 200.

The control unit 302 may be implemented in a number of different ways. For example, the control unit 302 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 304 may be used for communication between the control unit 302 and other functional units or devices of system 100 (e.g., the client device 110, the client device 160, the cloud server 130, the first online account database 140, the second online account database 150, or a combination thereof) or those described with reference to method 200. The control interface 304 may also be used for communication that is external to the functional units or devices of system 100 or those described with reference to method 200. The control interface 304 may receive information from the functional units or devices of system 100 or method 200, or from remote devices 320, or may transmit information to the functional units or devices of system 100 or method 200, or to remote devices 320. The remote devices 320 refer to units or devices external to system 100 or method 200.

The control interface 304 may be implemented in different ways and may include different implementations depending on which functional units or devices of system 100, method 200, or remote devices 320 are being interfaced with the control unit 302. For example, the control interface 304 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 304 may be connected to a communication infrastructure 322, such as a bus, to interface with the functional units or devices of system 100, method 200, or remote devices 320.

The storage unit 306 may store the software 310. For illustrative purposes, the storage unit 306 is shown as a single element, although it is understood that the storage unit 306 may be a distribution of storage elements. Also for illustrative purposes, the storage unit 306 is shown as a single hierarchy storage system, although it is understood that the storage unit 306 may be in a different configuration. For example, the storage unit 306 may be formed with different storage technologies forming a memory hierarchical system including different levels of caching, main memory, rotating media, or off-line storage. The storage unit 306 may be a volatile memory, a nonvolatile memory, an internal memory, an external memory, or a combination thereof. For example, the storage unit 306 may be a nonvolatile storage such as nonvolatile random access memory (NVRAM), Flash memory, disk storage, or a volatile storage such as static random access memory (SRAM) or dynamic random access memory (DRAM).

The storage unit 306 may include a storage interface 308. The storage interface 308 may be used for communication between the storage unit 306 and other functional units or devices of system 100 or method 200. The storage interface 308 may also be used for communication that is external to system 100 or method 200. The storage interface 308 may receive information from the other functional units or devices of system 100, method 200, or from remote devices 320, or may transmit information to the other functional units or devices of system 100 or to remote devices 320. The storage interface 308 may include different implementations depending on which functional units or devices of system 100, method 200, or remote devices 320 are being interfaced with the storage unit 306. The storage interface 308 may be implemented with technologies and techniques similar to the implementation of the control interface 304.

The communication unit 316 may enable communication to devices, components, modules, or units of system 100, method 200, or remote devices 320. For example, the communication unit 316 may permit the system 100 to communicate between the client device 110, the client device 160, the cloud server 130, the first online account database 140, the second online account database 150, or a combination thereof. In another example, the communication unit 316 may permit the functional units or devices described with reference to method 200 to communicate with each other. The communication unit 316 may further permit the devices of system 100 or method 200 to communicate with remote devices 320 such as an attachment, a peripheral device, or a combination thereof through the network 120.

As previously indicated, the network 120 may span and represent a variety of networks and network topologies. For example, the network 120 may include wireless communication, wired communication, optical communication, ultrasonic communication, or a combination thereof. For example, satellite communication, cellular communication, Bluetooth, IrDA, Wi-Fi, and WiMAX are examples of wireless communication that may be included in the network 120. Cable, Ethernet, DSL, fiber optic lines, FTTH, and POTS are examples of wired communication that may be included in the network 120. Further, the network 120 may traverse a number of network topologies and distances. For example, the network 120 may include direct connection, PAN, LAN, MAN, WAN, or a combination thereof.

The communication unit 316 may also function as a communication hub allowing system 100 to function as part of the network 120 and not be limited to be an end point or terminal unit to the network 120. The communication unit 316 may include active and passive components, such as microelectronics or an antenna, for interaction with the network 120.

The communication unit 316 may include a communication interface 318. The communication interface 318 may be used for communication between the communication unit 316 and other functional units or devices of system 100 or to remote devices 320. The communication interface 318 may receive information from the other functional units or devices of system 100, or from remote devices 320, or may transmit information to the other functional units or devices of the system 100 or to remote devices 320. The communication interface 318 may include different implementations depending on which functional units or devices are being interfaced with the communication unit 316. The communication interface 318 may be implemented with technologies and techniques similar to the implementation of the control interface 304.

The user interface 312 may present information generated by system 100. In several embodiments, a user can utilize the user interface 312 to interface with the devices of system 100 or remote devices 320. The user interface 312 may include an input device and an output device. Examples of the input device of the user interface 312 may include a keypad, buttons, switches, touchpads, soft-keys, a keyboard, a mouse, or any combination thereof to provide data and communication inputs. Examples of the output device may include a display interface 314. The control unit 302 may operate the user interface 312 to present information generated by system 100. The control unit 302 may also execute the software 310 to present information generated by system 100, or to control other functional units of system 100. The display interface 314 may be any graphical user interface such as a display, a projector, a video screen, or any combination thereof.

The above detailed description and embodiments of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The system 100 and the method 200 are cost-effective, highly versatile, and accurate, and may be implemented by adapting components for ready, efficient, and economical manufacturing, application, and utilization. Another important aspect of embodiments of the present disclosure is that they valuably support and service the trend of reducing costs, simplifying systems, and/or increasing system performance.

These and other valuable aspects of the embodiments of the present disclosure consequently further the state of the technology to at least the next level. While the disclosed embodiments have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the disclosure is not to be restricted except in light of the attached claims and their equivalents.

What is claimed is:

1. A computer-implemented method for entity integration, the computer-implemented method comprising:
    receiving, by one or more computing devices and from a user device in response to input from a user of the user device, an electronic request to associate a first online account of the user with a second online account of the user, wherein the first online account is associated with a first entity, and wherein the second online account is associated with a second entity different from the first entity;
    authenticating, based on an indication of an active login to the second online account enabled via credentials associated with the user and a determination that image data captured by the user device indicates the user, the user device to verify that an identity of the user is authentic;
    identifying a match between a first user property of the first online account and a second user property of the second online account;
    linking, based on the identified match between the first user property of the first online account and the second user property of the second online account, the first online account with the second online account;
    facilitating, based on the linking the first online account with the second online account, a transaction associated with the user via the second online account; and
    blocking, based on an indication of unauthorized access to the first online account received from the first entity, another transaction associated with the second online account.

2. The computer-implemented method of claim 1, wherein:
    the first entity is a financial institution; and
    the second entity is a merchant.

3. The computer-implemented method of claim 1, wherein:
    the first user property is a first e-mail address; and
    the second user property is a second e-mail address.

4. The computer-implemented method of claim 1, further comprising updating, based on a first online account property of the first online account, a second online account property of the second online account, wherein: the first online account property comprises first credit card information and the second online account property comprises second credit card information.

5. The computer-implemented method of claim 1, wherein the linking the first online account with the second online account is further based on:
    linking the first online account with the second online account in response to the user logging into the first online account through a graphical user interface associated with the second online account.

6. The computer-implemented method of claim 1, wherein:
    the first online account comprises a plurality of payment methods having a plurality of rewards points options; and
    wherein the facilitating the transaction associated with the user via the second online account comprises:
        selecting, based on a request for the transaction, one of the plurality of payment methods having a maximum rewards points;
        generating a first electronic message recommending the selected one of the plurality of payment methods for completing the transaction;
        transmitting the first electronic message to a secure application installed on the user device and associated with the user, the first online account, and the first entity;
        receiving, from the secure application, a second electronic message indicative of an instruction from the user to complete the transaction using the selected one of the plurality of payment methods; and
        in response to receiving the second electronic message, completing the transaction using the selected one of the plurality of payment methods.

7. The computer-implemented method of claim 1, further comprising:
    in response to determining that a third online account does not exist, generating the third online account based on the first online account.

8. The computer-implemented method of claim 7, further comprising:
    generating a password for the second online account;
    generating an electronic message comprising the password; and
    transmitting the electronic message to a secure application installed on the user device and associated with the user, the first online account, and the first entity.

9. The computer-implemented method of claim 4, further comprising:

in response to detecting an unauthorized access to the first online account, locking the first online account property of the first online account; and updating, based on the locked first online account property of the first online account, the second online account property of the second online account to lock the second online account property of the second online account.

10. A non-transitory computer readable medium having instructions stored thereon that, when executed by at least one computing device, cause the at least one computing device to perform operations for entity integration, the operations comprising:

receiving, from a user device in response to input from a user of the user device, an electronic request to associate a first online account of the user with a second online account of the user, wherein the first online account is associated with a first entity, and wherein the second online account is associated with a second entity different from the first entity;

authenticating, based on an indication of an active login to the second online account enabled via credentials associated with the user and a determination that image data captured by the user device indicates the user, the user device to verify that an identity of the user is authentic;

identifying a match between a first user property of the first online account and a second user property of the second online account;

linking, based on the identified match between the first user property of the first online account and the second user property of the second online account, the first online account with the second online account;

facilitating, based on the linking the first online account with the second online account, a transaction associated with the user via the second online account; and blocking, based on an indication of unauthorized access to the first online account received from the first entity, another transaction associated with the second online account.

11. The non-transitory computer readable medium of claim 10, wherein the linking the first online account with the second online account is further based on:

linking the first online account with the second online account in response to the user logging into the first online account through a graphical user interface associated with the second online account.

12. The non-transitory computer readable medium of claim 10, wherein:

the first online account comprises a plurality of payment methods having a plurality of rewards points options; and wherein the facilitating the transaction associated with the user via the second online account comprises:

selecting, based on an electronic request for the transaction, one of the plurality of payment methods having a maximum rewards points for the electronic transaction request;

generating a first electronic message recommending the selected one of the plurality of payment methods for completing the transaction;

transmitting the first electronic message to a secure application installed on the user device and associated with the user, the first online account, and the first entity;

receiving, from the secure application, a second electronic message indicative of an instruction from the user to complete the transaction using the selected one of the plurality of payment methods; and in response to receiving the second electronic message, completing the transaction using the selected one of the plurality of payment methods.

13. The non-transitory computer readable medium of claim 10, wherein the operations further comprise:

in response to determining that a third online account does not exist, generating the third online account based on the first online account.

14. The non-transitory computer readable medium of claim 13, wherein the operations further comprise:

generating a password for the second online account;

generating an electronic message comprising the password; and transmitting the electronic message to a secure application installed on the user device and associated with the user, the first online account, and the first entity.

15. The non-transitory computer readable medium of claim 10, the operations further comprising:

updating, based on a first online account property of the first online account, a second online account property of the second online account;

in response to detecting an unauthorized access to the first online account, locking the first online account property of the first online account; and updating, based on the locked first online account property of the first online account, the second online account property of the second online account to lock the second online account property of the second online account.

16. A system for entity integration, comprising:

one or more memories; and at least one processor each coupled to at least one of the one or more memories and configured to perform operations comprising:

receiving, from a user device in response to input from a user of the user device, an electronic request to associate a first online account of the user with a second online account of the user, wherein the first online account is associated with a first entity, and wherein the second online account is associated with a second entity different from the first entity;

authenticating, based on an indication of an active login to the second online account enabled via credentials associated with the user and a determination that image data captured by the user device indicates the user, the user device to verify that an identity of the user is authentic;

identify a match between a first user property of the first online account and a second user property of the second online account;

linking, based on the identified match between the first user property of the first online account and the second user property of the second online account, the first online account with the second online account;

facilitating, based on the linking the first online account with the second online account, a transaction associated with the user via the second online account; and blocking, based on an indication of unauthorized access to the first online account received from the first entity, another transaction associated with the second online account.

17. The system of claim 16, wherein the linking the first online account with the second online account is further based on:

linking the first online account with the second online account in response to the user logging into the first online account through a graphical user interface associated with the second online account.

18. The system of claim 16, wherein:

the first online account comprises a plurality of payment methods having a plurality of rewards points options; and wherein the facilitating the transaction associated with the user via the second online account comprises:

selecting, based on an electronic request for the transaction, one of the plurality of payment methods having a maximum rewards points for the electronic transaction request;

generating a first electronic message recommending the selected one of the plurality of payment methods for completing the transaction;

transmitting the first electronic message to a secure application installed on the user device and associated with the user, the first online account, and the first entity;

receiving, from the secure application, a second electronic message indicative of an instruction from the user to complete the transaction using the selected one of the plurality of payment methods; and in response to a receipt of the second electronic message, completing the transaction using the selected one of the plurality of payment methods.

19. The system of claim 16, the operations further comprising:

generating the second online account based on the first online account;

generating a password for the second online account;

generating an electronic message comprising the password; and transmitting the electronic message to a secure application installed on the user device and associated with the user, the first online account, and the first entity.

20. The system of claim 16, the operations further comprising:

in response to a detection of an unauthorized access to the first online account, locking a first online account property of the first online account; and updating, based on the locked first online account property of the first online account, a second online account property of the second online account to lock the second online account property of the second online account.

* * * * *